Nov. 1, 1938.                J. G. JACKSON                2,135,340
                              STAY FOR PAN SETS
                             Filed Feb. 23, 1937
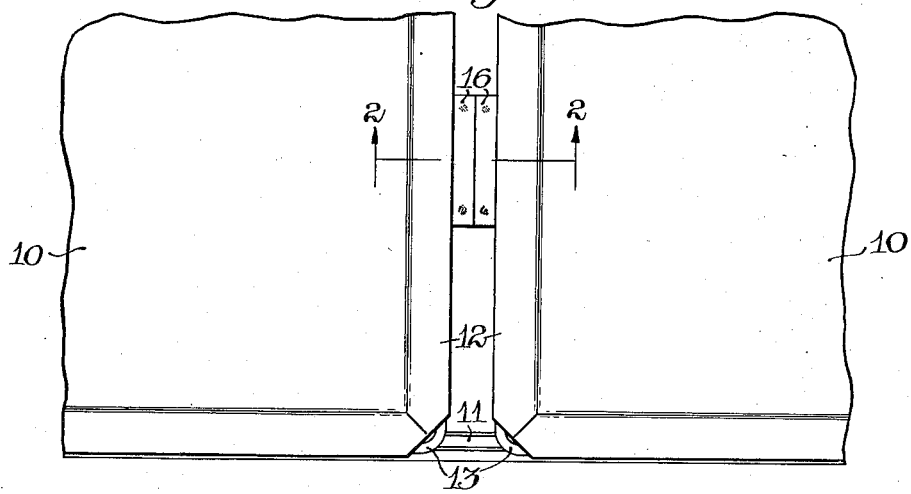
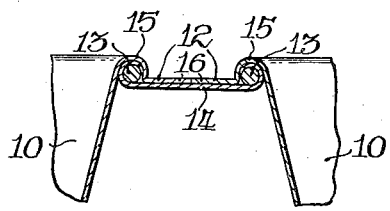
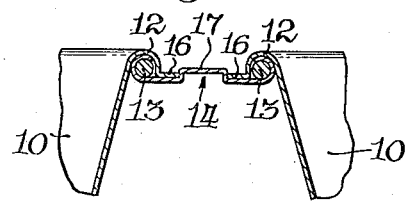
Inventor
Joseph G. Jackson
By Stanley Hoods
Atty.

Patented Nov. 1, 1938

2,135,340

UNITED STATES PATENT OFFICE 2,135,340

STAY FOR PAN SETS

Joseph G. Jackson, Oak Park, Ill., assignor to The Edward Katzinger Company, Chicago, Ill., a corporation of Illinois Application February 23, 1937, Serial No. 127,329

5 Claims. (Cl. 53—6)

This invention relates to stays to be interposed between the pans of a baking pan set and has for its object the permanent mounting of the stay between the pans of the set and the overcoming of any tendency of the stay to become loosened or moved relatively to the pans with which it cooperates.

With the above and other objects in view, as will be apparent, this invention consists in the construction, combination and arrangement of parts, all as hereinafter more fully described, claimed and illustrated in the accompanying drawing, wherein:

Fig. 1 is a fragmentary plan view of a pan set disclosing the present stay in position and coacting with the adjoining walls of adjacent pans of the set:

Fig. 2 is a transverse section taken through the stay along line 2—2 of Fig. 1 to illustrate the mounting thereof and its cooperation with the flanges at the edges of the pan walls:

Fig. 3 is a view similar to Fig. 2 showing a modified form of the present stay and its mounting.

Baking pan sets, consisting of a plurality of individual baking pans secured together in spaced, parallel relationship, usually embody stays or braces interposed between the adjoining walls of adjacent pans. These stays brace the walls of the pans with which they coact and maintain the alignment of the walls, prevent the bulging or bending of the walls under the pressure of the pan contents and generally strengthen and rigidify the set.

It has been found that the stays employed heretofore frequently loosen, sometimes become entirely disengaged from the coacting pan walls, and often move longitudinally relatively to the pans.

The present invention contemplates a brace or stay which, when once set in place between the adjoining walls of adjacent pans, is a permanent part of the pan set structure, cannot become loosened or be disengaged from the coacting pans, and is incapable of moving longitudinally with reference to the pans of the set.

Reference being had more particularly to the drawing, 10 indicates a plurality of baking pans of any suitable shape, construction or form, positioned in spaced parallel relationship and incorporated into a set in any desired manner, preferably by a rectangular frame 11 surrounding the entire group of pans 10, and resting flush against and secured to the exposed walls thereof in any suitable manner. Since the particular construction of the several pans of the set and the means by which they are combined into a set, form no part of the present invention, it is unnecessary to more particularly describe the same. It is sufficient to point out that the present stay can readily be applied to practically all types of pans and pan set constructions.

At the edges of the walls of the pans 10 are the flanges 12 which are usually bent downwardly about and substantially around the wires 13 lying against the pan walls adjoining their edges. While this formation of the outstanding beads on the pan walls is quite common and customary it is to be understood that the present invention can be applied to substantially all types of beads and can be readily used and applied even where the pans 10 are not provided with beads, or wires within the beads.

The stay comprises a relatively flat body 14 provided at its extremities with angularly disposed flanges 15 which, when the stay is in place, lie between the flanges 12 on the walls of the cooperating pans 10 and the wires 13. These flanges 15 follow the surface outline of the wires 13 and are held against the major portion of the surfaces thereof by the flanges 12, thereby firmly and rigidly held in place.

In those forms of the invention shown in Figs. 1, 2, and 3 the flanges 12 of the pans 10 in alignment with the ends of the stay 14, when seated as above described, are cut transversely to create ears or flaps 16 integrally anchored and secured to said flanges at the bases thereof. These flaps or ears 16 are bent outwardly to occupy coplanar positions and rest flush upon the upper surface of the body 14 of the stay, where they are fixed in any preferred and suitable manner such as by rivets or spot welding. The arrangement shown in Figs. 1 and 2 has the ears or flaps 16 abutting at their edges, medially of the body 14 of the stay. In Fig. 3 the depth of the ears or flaps 16 is not sufficient for their edges to abut or meet, therefore, in this form of the invention they lie flush against and are secured to the end portions of the body 14 of the stay and the central portion of the stay is elevated, as at 17, to be positioned between the edges of the ears or flaps 16.

From the foregoing, it is manifest that the stay 14 by its permanent connection to the ears or flaps 16 which at their bases are integral with the pan flanges 12, becomes to all intents and purposes an integral part of the pans 10. Likewise all or a major portion of the stay is laminated thereby increasing the strength of the stay 14, the pans 10 and the pan set as a whole. The stay 14 being permanently attached to and practically forming a part of the walls of the pans 10, cannot be disengaged therefrom or be moved relatively thereto. The ends of the ears or flaps 16 are always protected either by abutting one against the other, or by abutting at their longitudinal edges with the elevated central portion 17 of the stay 14 and as a consequence, cannot be distorted, elevated, accumulate dirt, or, by contact with other pans or any other element, be engaged and lifted. It will also be observed that at their bases, the ears or flaps 16 lie snugly against the end portions of the stay 14 and that the flanges 12 closely follow the wire 13 until they meet the plane of the body 14 of the stay where the ears or flaps 16 extend outwardly at an abrupt angle to lie flush against the upper surface of the stay.

What is claimed is:

1. The combination with a pair of spaced pans, having outstanding beads containing wires at the edges of the walls thereof, of a stay interposed between said pans, end flanges on said stay seated about the wires of the adjoining beads, and coplanar ears integrally formed on the walls of said pans and attached to said stay.

2. The combination with a pair of spaced pans, having outstanding beads containing wires at the edges of the walls thereof, of a stay interposed between said pans, end flanges on said stay seated about the wires of the adjoining beads, and ears formed integrally and projecting laterally from the adjoining pan walls to overlie the stay and be permanently secured thereto.

3. The combination with a pair of spaced pans, having outstanding beads containing wires at the edges of the walls thereof, of a stay interposed between said pans, end flanges on said stay seated about the wires of the adjoining beads, and ears integrally formed and projecting in the same plane from the adjoining pan walls to overlie the stay, be permanently secured thereto, and abut at their edges centrally thereof.

4. The combination with a pair of spaced pans, having outstanding beads containing wires at the edges of the walls thereof, of a stay interposed between said pans, end flanges on said stay seated about the wires of the adjoining beads, and ears integrally formed and projecting in the same plane from the adjoining pan walls to overlie the stay and be permanently secured thereto, the stay being elevated between the edges of said ears.

5. The combination with a pair of spaced pans, of a stay interposed therebetween, and ears formed integrally from the adjoining pan walls to overlie the stay and be there permanently secured to the stay, and an angular raised portion medially of the stay positioned between and abutting the outer edges of the ears aforesaid.

JOSEPH G. JACKSON.